United States Patent [19]
Ono et al.

[11] Patent Number: 6,079,840
[45] Date of Patent: Jun. 27, 2000

[54] SURFACE LIGHT SOURCE DEVICE HAVING SHIELDING LAYER

[75] Inventors: Toshiaki Ono, Akishima; Manabu Takashio, Kawaguchi; Nobuhiro Arai, Kasukabe, all of Japan

[73] Assignee: Enplas Corporation, Kawaguchi, Japan

[21] Appl. No.: 08/953,553

[22] Filed: Oct. 17, 1997

[30] Foreign Application Priority Data

Oct. 17, 1996 [JP] Japan ................................. 8-295676

[51] Int. Cl.⁷ .................................................. F21V 7/04
[52] U.S. Cl. ............................ 362/31; 362/29; 362/298; 362/299; 362/301; 362/303; 362/346; 362/349
[58] Field of Search ............................... 362/31, 29, 298, 362/299, 301, 303, 346, 349

[56] References Cited

U.S. PATENT DOCUMENTS

| | | | |
|---|---|---|---|
| 4,648,690 | 3/1987 | Ohe | 362/31 |
| 5,207,493 | 5/1993 | Murase et al. | 362/31 |
| 5,392,199 | 2/1995 | Kashima et al. | 362/31 |
| 5,560,698 | 10/1996 | Okano | 362/31 |

*Primary Examiner*—Sandra O'Shea
*Assistant Examiner*—Ronald E. DelGizzi
*Attorney, Agent, or Firm*—Staas & Halsey LLP

[57] ABSTRACT

There is provided a surface light source device of side light type, which is not reduced in efficiency of illumination light utilization, even if the surface light source device is subjected to fringing such as to trim a luminant portion. For instance, a light shielding layer formed by coating black ink 21A, which absorbs illumination light, by means of printing is provided on a protection sheet 21 arranged as the outermost emission-side additional sheet. The light shielding layer absorbs and shields illumination light L1 tending to be transmitted through a peripheral edge portion of the protection sheet 12, and as a result, provides fringing. A reflective surface is formed by applying a silver tape 21B or the like to a surface facing the light guide plate 6. Since illumination light reflected by the silver tape 21B is used again inside the light guide plate 6, it is possible to avoid a reduction in efficiency of light utilization. The reflective layer may be narrower or wider than the light shielding layer, or may be equal in width to the light shielding layer at need. The reflective surface and the light shielding layer may be also formed on other components.

10 Claims, 5 Drawing Sheets

20: SURFACE LIGHT SOURCE DEVICE OF SIDE LIGHT TYPE 3 (20) : SURFACE LIGHT SOURCE
DEVICE OF SIDE
LIGHT TYPE

SURFACE LIGHT SOURCE DEVICE HAVING SHIELDING LAYER

BACKGROUND

1. Field of Invention

This invention relates to a surface light source device of side light type, and more particularly, to a surface light source device of side light type, which is capable of reducing loss of light caused in relation to fringing. The present invention is applied to a backlighting arrangement in a liquid crystal display, for instance.

2. Related Art

It is a matter of common knowledge that a surface light source device of side light type provides a thin backlighting arrangement to illuminate a liquid crystal display panel. FIG. 5 is an exploded perspective view showing a liquid crystal display employing the surface light source device of side light type in a backlighting arrangement. Referring to FIG. 5, a liquid crystal display 1 has a liquid crystal display panel 2, a surface light source device of side light type 3 arranged for backlighting in the liquid crystal display panel 2, and a substrate (a drive substrate) 4 mounted with a drive circuit or the like in the liquid crystal display panel 2.

In general, the surface light source device of side light type 3 has a light guide plate serving as a light guide member made of a light guiding material, and a primary light source including a long cylindrical light source to supply illumination light to the light guide plate through a lateral side thereof.

Illumination light emitted from the primary light source is introduced into the light guide plate through an end surface of the light guide plate. The introduced illumination light is refracted and then emitted through one of major surfaces of the light guide plate toward the liquid crystal display panel. Since the primary light source is arranged on the lateral side of the light guide plate, it is easy to give a thin overall structure to the device.

Well-known light guide plates employed in the surface light source device of side light type as described above are classified into a light guide plate of a type, which is approximately uniform in thickness, and a light guide plate of a type, which shows a tendency to decrease a thickness according as the light guide plate becomes more distant from the primary light source. In general, the light guide plate of the latter type emits illumination light more efficiently than the light guide plate of the former type.

FIG. 6 is an exploded perspective view showing a surface light source device of side light type employing the light guide plate of the latter type. FIG. 7 is a sectional view taken along a line A—A in FIG. 6.

Referring to FIGS. 6 and 7, the surface light source device of side light type 3 has a light guide plate 6, and a primary light source 7 is arranged on the lateral side of the light guide plate. The surface light source device 3 further has a reflection sheet 8, a diffusible sheet 9, prism sheets 10, 11 functioning as a light control member, and a protection sheet 12 of low diffusibility. A transparent sheet having no diffusibility may be employed as the protection sheet 12. Otherwise, another transparent sheet may be arranged on the further outside of the protection sheet 12. These components are laminatedly arranged.

The primary light source 7 has a cold cathode tube (a fluorescent lamp) 13 and a reflector 14 surrounding the cold cathode tube. The reflector 13 has an aperture, through which illumination light is supplied toward an end surface 6A of the light guide plate 6. The reflector 14 is made of a regular reflective or diffuse reflective sheet material or the like. The light guide plate 6 having a wedge-shaped section is made of an acrylic material (PMMA resin), for instance, by means of injection molding. The light guide plate receives the illumination light from the primary light source 7 through one end surface serving as an incidence surface 6A.

In the light guide plate 6, illumination light makes a propagation while undergoing repetitive reflection between a major surface (which will be hereinafter referred to as "a slope") 6B, along which the reflection sheet 8 is disposed, and another major surface (which will be hereinafter referred to as "an emitting surface") 6C, along which the diffusible sheet 9 is disposed.

Every time reflection occurs, a component of light incident at an angle of not more than a critical angle is emitted through the slope 6B and the emitting surface 6C. As is well known, the illumination light emitted through the emitting surface 6C is inclined to mainly make a propagation toward the wedge end. This phenomenon is called emitting directivity.

Further, a diffusible surface 6D is formed on the slope 6B. The diffusible surface 6D is provided with diffusibility which steps up from the side of the incidence surface 6A toward the wedge end. The diffusibility is provided by coating the slope with diffusible ink containing a pigment consisting of magnesium carbonate, titanium oxide or the like, for instance. The degree of diffusibility may be adjusted according to a quantity of diffusible ink coated on the slope.

The slope 6B may be also provided with the diffusibility by matting (roughening) the slope 6B, instead of coating the slope with the diffusible ink. In this case as well, such diffusibility as steps up from the incidence surface 6A toward the wedge end is provided. Accordingly, matted surface areas of a rectangular shape, for instance, are formed in a distributed state at a certain or random pitch such that the density of areas steps up from the side of the incidence surface 6A toward the wedge end.

The light guide plate 6 described above corrects a quantity of output light decreased in the vicinity of the wedge end, and makes the distribution in quantity of output light uniform. It is to be noted that the diffusibility described above is not so intensive as the light guide plate is allowed to lose the emitting directivity. That is, even if the diffusibility is provided to the slope 6B, the illumination light emitted through the emitting surface 6C is inclined to mainly make a propagation toward the wedge end.

The reflection sheet 8 is made of a sheet-like regular reflective member consisting of metal foil or the like, or a sheet-like diffuse reflective member consisting of a white PET film or the like. Illumination light leaking out of the slope 6B is incident again onto the light guide plate 6 after having been reflected by the reflection sheet 4, resulting in improvement of efficiency of illumination light utilization.

A variety of sheet-like components are arranged parallel to the emitting surface 6C of the light guide plate 6. In this specification, these sheet-like components will be generally referred to as "emission-side additional sheets".

The prism sheets 10, 11 are arranged as the innermost emission-side additional sheets to correct the emitting directivity of the light guide plate 6. The diffusible sheet 9 prevents the diffusible surface 6D on the slope 6B from being visibly observed from above the emitting surface 6C, and also makes highlight and shadow or the like in each part of the light guide plate 6 illuminated with the illumination light less noticeable.

The diffusible sheet 9 diffuses the illumination light emitted through the light guide plate 6. The prism sheets 10, 11 are made of a light-transmitting sheet material such as polycarbonate. In each prism sheet, a surface (an outside surface) with its back to the light guide plate 6 is formed as a prism surface. The prism surface is composed of a large number of projections which are triangular in sectional shape and run substantially parallel in one direction. In this case, the projections on the inside prism sheet 10 are oriented so as to run parallel to the incidence surface 6A, while the projections on the prism sheet 11 are oriented so as to run in a direction orthogonal to the incidence surface 6A.

The prism sheets 10, 11 correct a main emitting direction of output light with a slope of each projection so as to emit output light in a frontal direction of the emitting surface 6C. It may be also possible to use a so-called double faced prism sheet having both surfaces respectively serving as prism surfaces.

In general, the surface light source device of side light type employing the wedge-shaped light guide plate and the prism sheets described above emits output light in the frontal direction more efficiently than a surface light source device of side light type employing a light guide plate which is substantially uniform in thickness.

The protection sheet 12 protects a surface of the prism sheet 11 from damage or the like, and relieves the directivity of output light corrected by the prism sheets 10, 11 to enlarge an angle of visual field. Accordingly, it is possible to emit the illumination light to a desired extent in the frontal direction of the emitting surface. Consequently, the diffusible sheet 9, the prism sheets 10, 11 and the protection sheet 12 respectively function as illumination light correction sheets to correct the characteristics of output light direction. Most of the emission-side additional sheets serve as the illumination light correction sheets as described above.

On the other hand, the liquid crystal display panel 2 has various components such as a polarizer, a glass substrate and a liquid crystal cell, which are laminatedly arranged. The liquid crystal cell is put between a pair of glass substrates respectively provided with transparent electrodes. A peripheral edge of the liquid crystal display panel 2 is generally subjected to fringing 19 at an appropriate width. For instance, the fringing 19 is provided in the form of a light shielding layer formed by coating the peripheral edge with black ink by means of printing or applying a black tape to the peripheral edge and so on. The light shielding layer restrains illumination light from intruding into the liquid crystal display panel through its periphery and accordingly prevents a reduction in sharpness of image display.

It is to be noted that the number of steps of manufacturing the liquid crystal display panel 2 is increased due to a process of subjecting the liquid crystal display panel 2 to the fringing 19. If the fringing 19 is applied to the surface light source device of side light type 3, instead of the liquid crystal display panel 2, it is possible to avoid an increase of the number of steps of manufacturing the liquid crystal display panel 2.

Further, if the fringing 19 is not applied to the liquid crystal display panel 2, it is possible to rationalize the distribution of works in the whole steps of manufacturing the liquid crystal display 1, and to reduce the number of steps as a whole.

However, the process of subjecting the surface light source device of side light type 3 to fringing leads to a problem of a reduction in efficiency of illumination light utilization. The reason is that when the surface light source device of side light type 3 is subjected to fringing such as to trim a luminant portion thereof, illumination light is absorbed in an area subjected to fringing, and this phenomenon affects a luminant portion (which does not require shielding) surrounded with the area subjected to fringing, resulting in a reduction of luminance in an emitting area. On the other hand, when the liquid crystal display panel 2 is subjected to the fringing 19, the above phenomenon does not occur, and there is no possibility that the fringing 19 provides dark display.

The above conditions are similarly observed also in cases other than the display employing the liquid crystal display panel as a substance arranged for backlighting. That is, it is preferable that the luminant portion of the surface light source device itself may be subjected to fringing, instead of the substance arranged for backlighting.

OBJECT AND SUMMARY OF INVENTION

An object of the present invention is to overcome the above conditions and to provide a surface light source device of side light type, which is subjected to fringing so as to avoid a reduction in efficiency of illumination light utilization.

The present invention is applied to a surface light source device of side light type including a light guide plate having an emitting surface as one of major surfaces, a primary light source to supply light to the light guide plate through a lateral side thereof so as to allow the light to emit through the emitting surface, and one or more emission-side additional sheets arranged parallel to the emitting surface of the light guide plate.

According to the features of the present invention, a shielding layer to subject the surface light source device of side light type to fringing is provided in the range from the emitting surface to the outermost emission-side additional sheet, and a reflective surface to return illumination light to the light guide plate is provided in the vicinity and on the inside of the light shielding layer.

The reflective surface may be provided on the light shielding layer. Otherwise, the reflective surface may also be provided on an emission-side additional sheet other than the emission-side additional sheet provided with the light shielding layer, or on the emitting surface of the light guide plate. The typical emission-side additional sheet provided with the light shielding layer is a protection sheet.

The reflective surface may be narrower or wider than the light shielding surface, or may be equal in width to the light shielding surface at need.

In case of subjecting the surface light source device of side light type according to the present invention to fringing, since the reflective surface to reflect illumination light correspondingly to the fringing is provided on the inside of the light shielding layer adapted for the fringing, the illumination light shielded by the fringing may be reused after having been allowed to return to the light guide plate. Thus, it is possible to avoid a reduction in efficiency of illumination light utilization caused under the influence of fringing. Thus, the surface light source device of side light type according to the present invention may provide a bright backlighting arrangement for a display such as a liquid crystal display.

Hereinafter, a better understanding of the present invention and its features will be given with reference to the accompanying drawings.

PREFERRED EMBODIMENTS

Figure 1:
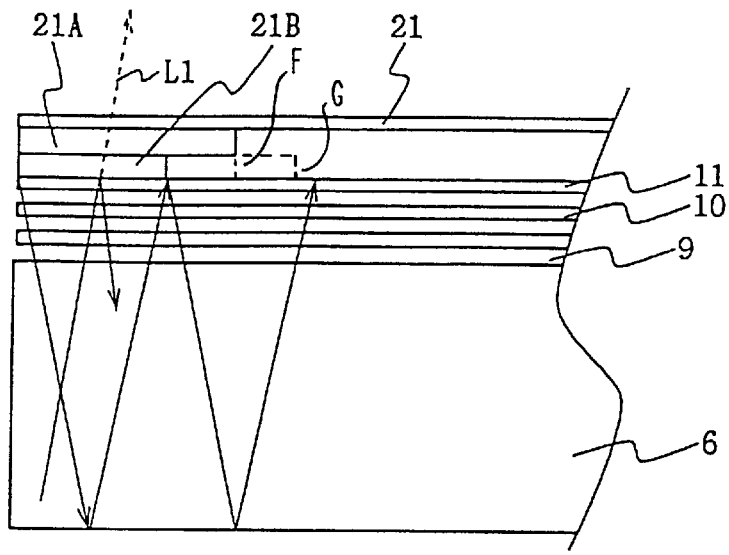
FIG. 1 is a sectional view partially showing a surface light source device of side light type according to one embodiment of the present invention.
Figure 2:
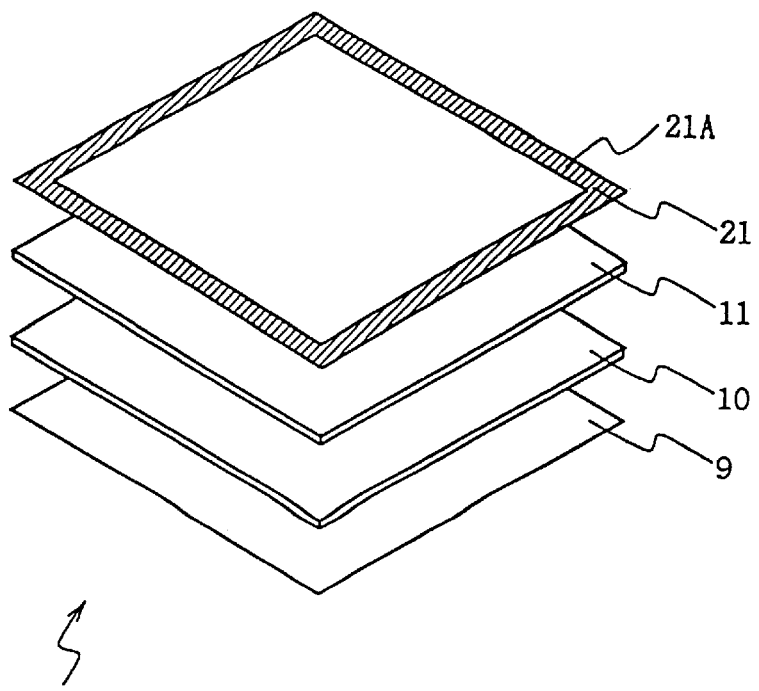
FIG. 2 is a perspective view showing illumination light correction sheets employed in the surface light source device of side light type shown in FIG. 1.
Figure 6:
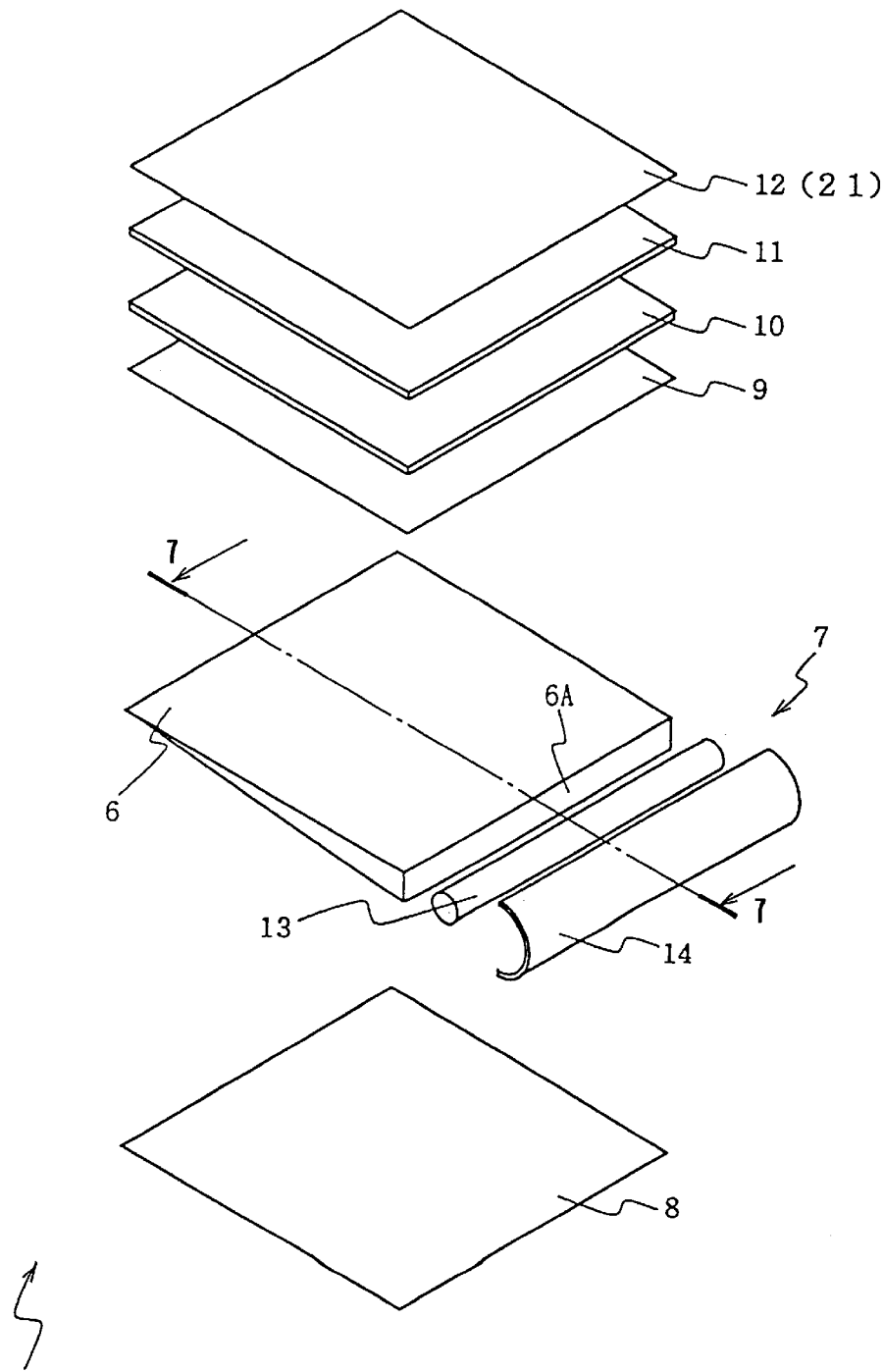
FIG. 6 is an exploded perspective view showing the general structure of a surface light source device of side light type.
Figure 7:
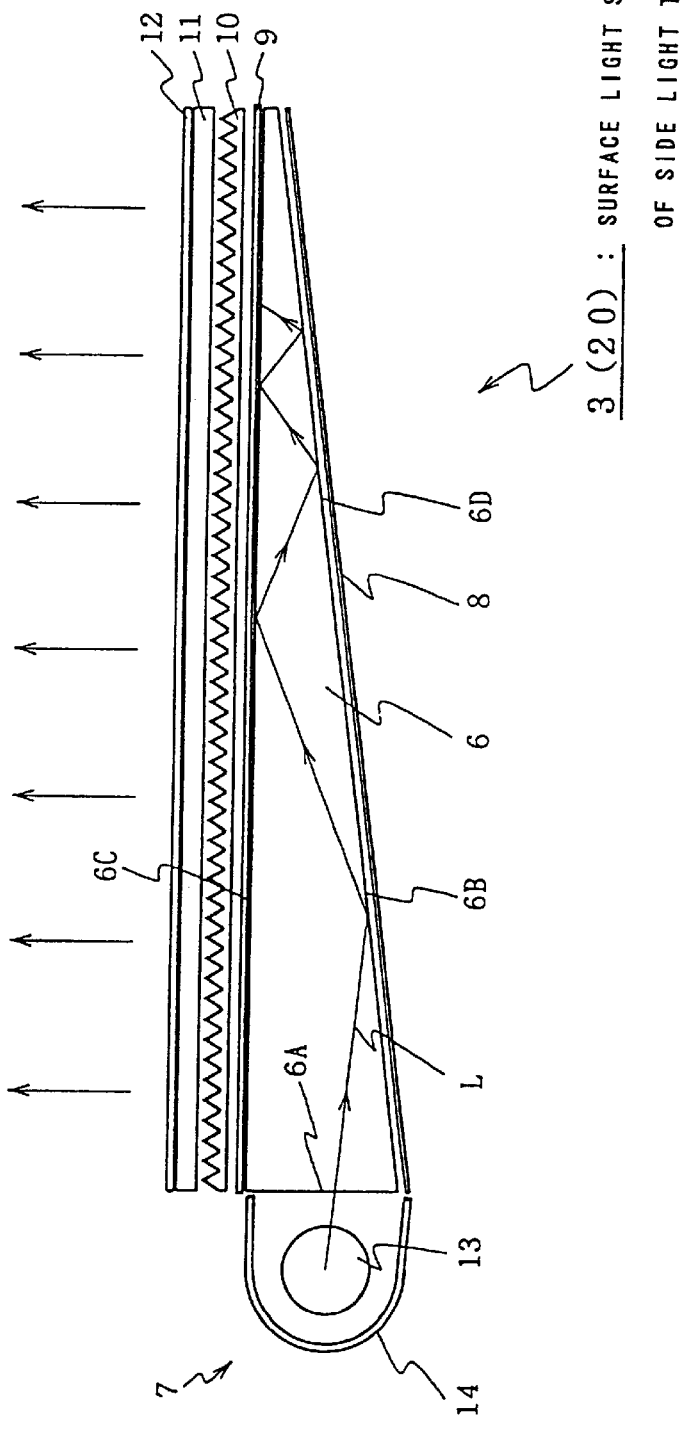
FIG. 7 is a sectional view taken along a line A—A in FIG. 6.

A description will first be given of the first embodiment of the present invention with reference to FIGS. 1 and 2 partially together with FIGS. 6 and 7. A surface light source device of side light type 20 comprises a protection sheet denoted by a reference numeral 21, instead of the protection sheet 12 employed in the surface light source device of side light type 3 shown in FIG. 6. Incidentally, it is to be noted that reference numerals 20, 21 in FIGS. 6 and 7 are shown in parentheses.

The surface light source device of side light type 20 has a basic arrangement, except the protection sheet, in common with the surface light source device of side light type described above. According to the first embodiment, as shown in FIGS. 1 and 2, the protection sheet 21 arranged as the outermost emission-side additional sheet has a light shielding layer (a light absorbable layer) coated with black ink 21A, which absorbs illumination light, by means of printing. The light shielding layer covers an area of a certain width corresponding to a peripheral edge portion of the emitting surface of a light guide plate 6.

The light shielding layer formed by coating the protection sheet 21 with the ink 21A by means of printing provides fringing in the first embodiment. This light shielding layer absorbs illumination light L1 tending to be transmitted through the peripheral edge portion of the protection sheet 21, and shields the illumination light. Thus, even if the fringing is not applied to the liquid crystal display panel, it is possible to display an image of high grade.

Further, in the protection sheet 21, a silver tape 21B to efficiently reflect the illumination light is applied to a surface of the light-absorbable light shielding layer facing the light guide plate 6. The silver tape 21B provides a reflective surface to reflect the illumination light inside the light shielding layer.

In the first embodiment, illumination light coming to a light shielding surface (ink 21A) is reflected by the reflective surface toward the light guide plate 6, and the reflected illumination light is reused in the light guide plate 6. Thus, it is possible to prevent a loss of illumination light, and to restrain a reduction in efficiency of photo energy utilization.

It is preferable that the reflective surface is formed to be narrower than the light shielding surface, and is coincident in outer periphery with the light shielding surface.

In this case, the light shielding surface of the protection sheet 21 in an inside portion of the fringing is exposed toward the light guide plate 6. Such a form of the light shielding surface is suitable for preventing irregularities in luminance from occurring on the emitting surface due to excessive illumination light caused in the vicinity of the outer periphery of the light guide plate 6 under the influence of the illumination light allowed to return from the reflective surface toward the light guide plate 6.

That is, in the first embodiment, since the light shielding surface in the inside portion of the fringing is exposed toward the light guide plate 6, excessive output light is absorbed to avoid the irregularities in luminance on the emitting surface.

A behavior of light in the surface light source device on the whole will be given in the following with reference to part of FIGS. 6 and 7. Illumination light emitted from a fluorescent lamp 13 is introduced into the light guide plate 6 through an incidence surface 6A directly or after having been reflected by a reflector 14. In the light guide plate 6, illumination light makes a propagation while undergoing repetitive reflection between two major surfaces, i.e., a slope 6B and an emitting surface 6C.

Every time reflection occurs, a component of light incident at an angle of not more than a critical angle is emitted through the slope 6B and the emitting surface 6C mainly in an oblique direction. The characteristics of illumination light emitted through the emitting surface 6C are corrected by illumination light correction sheets 9, 10, 11 and 21.

First, the illumination light is subjected to diffusion by the diffusible sheet 9, and the characteristics of the illumination light are corrected such that the diffusible surface 6D formed by coating the slope 6B of the light guide plate 6 with ink by means of printing is made less noticeable. Subsequently, the characteristics of output light direction are corrected by the prism sheets 10, 11 such as to mainly emit the output light in a frontal direction of the emitting surface. Further, directivity of the illumination light after having been passed through the prism sheets 10, 11 is relieved by the low diffusing action of the protection sheet 21.

It must be noted that among illumination light emitted through the emitting surface 6C toward the liquid crystal display panel, illumination light incident onto the outermost peripheral edge portion (the silver tape 21B) of the protection-sheet 21 is allowed to return to the inside of the light guide plate 6 after having been reflected by the reflective surface provided on the inner side of the light shielding layer, and is then reflected inside the light guide plate 6 so as to be emitted again toward the liquid crystal display panel. That is, it is possible to achieve the reuse of a considerable part of light incident onto the fringing portion.

The light incident onto a portion including no silver tape 21B is absorbed by the exposed light shielding layer. As a result, illumination light transmitted through the reflective layer or illumination light intruding into the liquid crystal display panel through a gap between the protection sheet 21 and the prism sheet 11 may be shielded and also prevented from being emitted to the liquid crystal display panel.

Thus, the liquid crystal display employing the form in the first embodiment for the backlighting arrangement may display an image of high quality Without subjecting the liquid crystal display panel to fringing.

Further, among illumination light allowed to return to the light guide plate 6 by the reflective surface, a component of illumination light emitted toward the liquid crystal display panel through the vicinity of the fringing portion by the action of the reflective surface is shielded by the light shielding surface formed to be wider than the reflective surface. Accordingly, in case of attempting to reuse the illumination light after having been allowed to return to the inside of the light guide plate 6 by the reflective surface, an upward tendency in luminance level is restrained from excessively growing in the vicinity of the peripheral edge portion, and the irregularities in luminance are prevented from occurring.

According to the embodiment, in addition to the above action, when upper and lower edges of the incidence surface 6A of the light guide plate 6 are illuminated with illumination light, it is possible to reduce the irregularities in luminance caused by these edges observed from above the emitting surface.

As described above, according to the embodiment, while the surface light source device of side light type is subjected to fringing, it is possible to adapt the reflective layer to avoid a loss of absorption caused under the influence of fringing, to reuse the reflected light as illumination light, and besides, to prevent the irregularities in luminance which are easily caused in the peripheral edge portion of the light guide plate.

It is to be understood that the above embodiments are not restrictive the present invention. The following modifications, for instance, may be made in the present invention.

Figure 3:
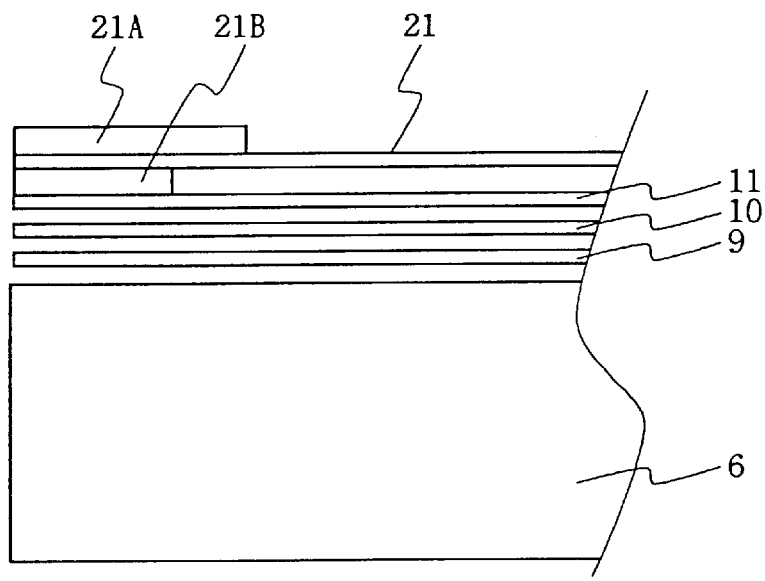
FIG. 3 is a sectional view showing a surface light source device of side light type according to another embodiment of the present invention.

(a) In the above embodiment, the light shielding layer and the reflective layer are laminatedly arranged on the surface of the protection sheet facing the light guide plate. However, the present invention is not limited to this embodiment. For instance, as shown in FIG. 3, the light shielding layer (the black ink layer 21A) and the reflective layer (the silver tape 21B) may be respectively formed on both surfaces of the protection sheet 21.

Figure 4:
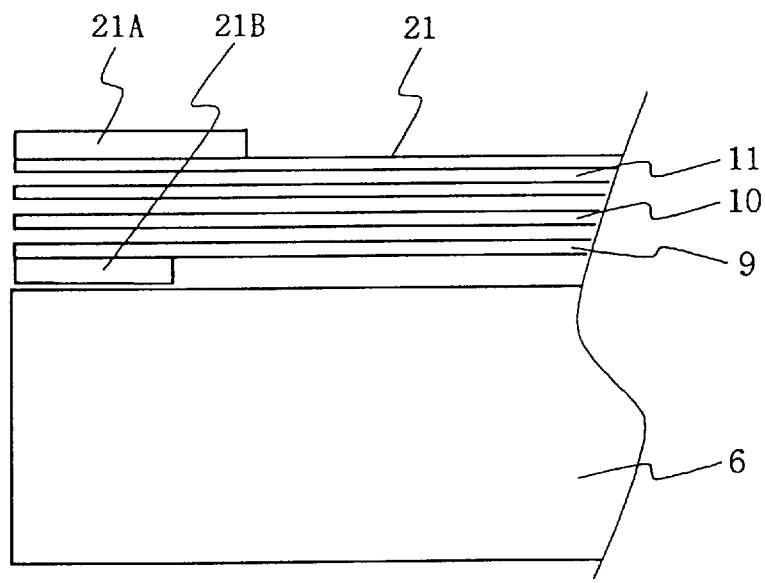
FIG. 4 is a sectional view for explaining an embodiment, in which a light shielding layer and a reflective layer are respectively formed on two pieces of illumination light correction sheets.
Figure 5:
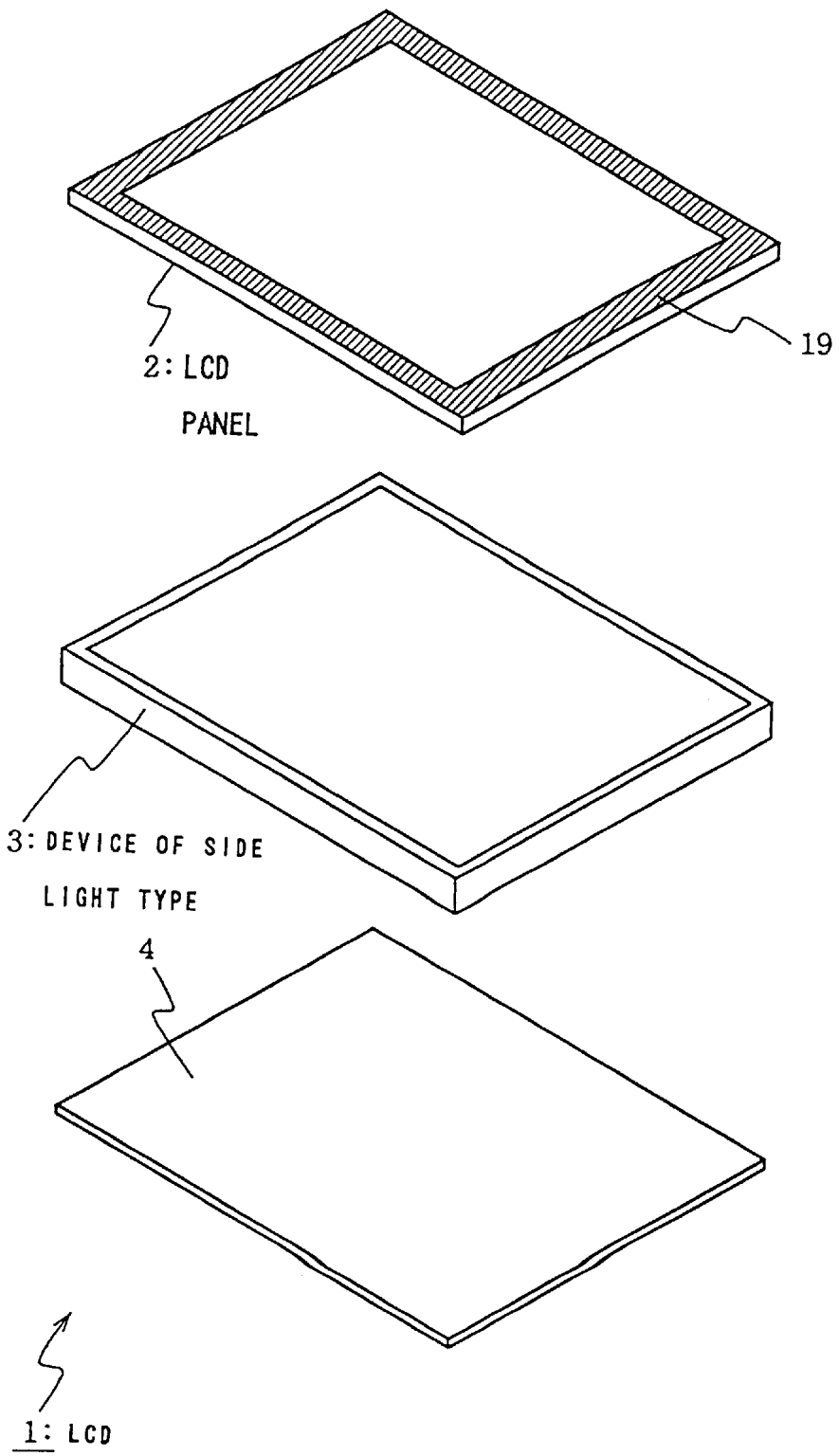
FIG. 5 is a perspective view showing a liquid crystal display in a prior art.

(b) In the above embodiment, the light shielding layer having the reflective surface is formed on the protection sheet to provide fringing. However, the present invention is not limited to this embodiment. For instance, as shown in FIG. 4, the light shielding layer and the reflective layer may be respectively formed on different illumination light correction sheets. Further, the reflective layer may be formed on the emitting surface of the light guide plate 6, while the light shielding layer may be formed on the illumination light correction sheet. Incidentally, FIG. 4 shows an embodiment, in which the light shielding layer is formed on the emitting surface of the protection sheet 21, while the reflective layer is formed on the incidence surface of the diffusible sheet 9.

Further, the light shielding layer and the reflective layer may be laminatedly arranged on the side of the incidence surface of the diffusible sheet 9. Otherwise, the light shielding layer may be formed on the side of the emitting surface of the diffusible sheet 9, while the reflective layer may be formed on the incidence surface.

(c) In the above embodiment, the reflective layer is formed to be narrower than the light shielding layer. However, the present invention is not limited to this embodiment. For instance, the light shielding layer may be formed to be equal in width to the reflective layer, as indicated with F in FIG. 1. If necessary, the reflective layer may be formed to be wider than the light shielding layer coated with black ink or the like, as indicated with G in FIG. 1. In this case, the reflective layer also has a light shielding function. Accordingly, the width of fringing is influenced depending on the width of the reflective layer.

(d) In the above embodiment, the light shielding layer and the reflective layer are formed along four sides of the illumination light correction sheet. However, the present invention is not limited to this embodiment. The light shielding layer and the reflective layer may be also formed along any of the four sides.

(e) In the above embodiment, the light shielding layer is formed by coating black ink by means of printing. However, the present invention is not limited to this embodiment. For instance, a black tape may be also applied for fringing. Gray ink or a gray tape, for instance, may be also available, instead of the black ink or black tape.

(f) In the above embodiment, the silver tape is employed to form the reflective surface. However, the present invention is not limited to this embodiment. Silver ink or white ink coated by means of printing or a metal layer made of silver or aluminum may be also employed to form the reflective surface. Regular reflection or diffuse reflection may be allowable in the characteristics of reflection.

(g) In the above embodiment, the diffusible sheet 9, the prism sheets 10, 11 and the protection sheet 21 respectively functioning as the illumination light correction sheets are arranged in sequence along the emitting surface of the light guide plate 6. However, the present invention is not limited to this embodiment.

That is, the kind or number of illumination light correction sheets arranged on the emitting surface may be altered at need. For instance, it is possible to arrange only a piece of prism sheet. Otherwise, it is also possible to arrange a so-called double faced prism sheet having both surfaces respectively serving as prism surfaces. The present invention may be also applicable to an arrangement using no prism sheet.

(h) In the above embodiment, the protection sheet 21 is used to correct again the directivity of output light having been corrected by the prism sheet, and to protect the prism sheet. However, the present invention is not limited to this embodiment. A transparent sheet fit only for protection of the prism sheet may be used as the protection sheet. Further, it is also possible to laminatedly arrange such the transparent sheet and the diffusible protection sheet.

In this case, at least one or both of the light shielding surface and the reflective surface may be formed on the transparent protection sheet. Further, required locations for the light shielding surface and the reflective surface may be freely selected among the side of the emitting surface, the side of the incidence surface and both the incidence and emitting surfaces of the transparent protection sheet at need.

(i) In the above embodiment, the diffusible surface is formed on a surface opposite to the emitting surface of the light guide plate. However, the present invention is not limited to this embodiment. For instance, the diffusible surface may be formed on the emitting surface of the light guide plate. Otherwise, it is also possible to form the diffusible surface on both the emitting surface and its opposite surface.

(j) In the above embodiment, illumination light is supplied through one end surface (the incidence surface) of the light guide plate. However, the present invention is not limited to this embodiment. The illumination light may be supplied to a plurality of end surfaces (incidence surfaces).

(k) In the above embodiment, the long cylindrical light source is employed as the primary light source. However, the present invention is not limited to this embodiment. For instance, one or more point light sources such as light-emitting diodes may be also employed as the primary light source.

(l) In the above embodiment, the light guide plate having a wedge-shaped section is employed. However, the present invention is not limited to this embodiment. For instance, the present invention may be also applied to a surface light source device of side light type employing a light guide plate which is approximately uniform in thickness.

(m) In the above embodiment, descriptions have been given of the application of the present invention to backlighting in a liquid crystal display. However, the present invention is not limited to this embodiment. The present invention may be also generally applied to other surface light source devices of side light type such as illumination equipments and displays employing the fringed surface light source device.

As has been described in detail, according to the surface light source device of side light type in the present invention, in case of subjecting a luminant portion on the emitting surface to fringing, since the reflective surface to reflect the illumination light is formed correspondingly to the fringing in the range from the emitting surface of the light guide plate to the outermost emission-side additional sheet, the illumination light shielded by the fringing is reused after having been allowed to return to the light guide plate.

Accordingly, it is possible to prevent a reduction in efficiency of illumination light utilization caused under the influence of fringing, and to provide a bright backlighting arrangement for the display such as a liquid crystal display.

What is claimed is:

1. A surface light source device of side light type, comprising:

a light guide plate having an emitting surface as one major surface, and a lateral side;

a primary light source to supply light to the light guide plate through the lateral side thereof so as to allow the light to be emitted from said emitting surface;

at least one additional sheet arranged along said emitting surface, the sheet positioned furthest from said emitting surface defining an outermost additional sheet;

a light-absorptive light shielding layer disposed between said emitting surface and the outermost additional sheet so as to subject the surface light source device of side light type to fringing; and a reflective layer disposed between said light-absorptive light shielding layer and said emitting surface so as to return light to said light guide plate and to prevent the light from being absorbed by said light-absorptive light shielding layer.

2. A surface light source device of side light type according to claim 1, wherein said reflective layer is adjacent to said light-absorptive light shielding layer.

3. A surface light source device of side light type according to claim 1, wherein said reflective layer is apart from the light-absorptive light shielding layer.

4. A surface light source device of side light type according to claim 1, wherein said reflective layer is disposed on said emitting surface.

5. A surface light source device of side light type according to claim 1, wherein light-absorptive light shielding layer is formed on an additional sheet which is a protection sheet.

6. A surface light source device of side light type according to claim 2, wherein said light-absorptive light shielding layer is adjacent to an additional sheet which is a protection sheet.

7. A surface light source device of side light type according to claim 3, wherein said light-absorptive light shielding layer is adjacent to an additional sheet which is a protection sheet.

8. A surface light source device of side light type according to any one of claims 1 to 7, wherein said reflective layer is narrower than the light-absorptive light shielding layer.

9. A surface light source device of side light type according to any one of claims 1 to 7, wherein the light-absorptive light shielding layer is equal in width to said reflective layer.

10. A surface light source device of side light type according to any one of claims 1 to 7, wherein said reflective layer is wider than the light-absorptive light shielding layer.

* * * * *

UNITED STATES PATENT AND TRADEMARK OFFICE
CERTIFICATE OF CORRECTION

PATENT NO. : 6,079,840
DATED : June 27, 2000
INVENTOR(S) : Toshiaki Ono, et al.

Page 1 of 1

It is certified that error appears in the above-identified patent and that said Letters Patent is hereby corrected as shown below:

Title page,
Item [54] after "LAYER" insert -- SHEET AND REFLECTIVE LAYER BETWEEN SHEILDING LAYER AND LIGHT GUIDE --.

Column 1,
Line 2, after "LAYER" insert -- SHEET AND REFLECTIVE LAYER BETWEEN SHIELDING LAYER SHEET AND LIGHT GUIDE --.

Column 6,
Line 43, delete "-"
Line 59, change "Without" to -- without --.

Signed and Sealed this

Eleventh Day of September, 2001

Attest:

NICHOLAS P. GODICI
Attesting Officer
Acting Director of the United States Patent and Trademark Office